United States Patent [19]

Pandel

[11] Patent Number: 5,719,631
[45] Date of Patent: Feb. 17, 1998

[54] METHOD AND APPARATUS FOR CODING A VIDEO DATA STREAM OF A VIDEO SEQUENCE FORMED OF IMAGE BLOCKS

[75] Inventor: Juergen Pandel, Feldkirchen-Westerham, Germany

[73] Assignee: Siemens Aktiengesellschaft, Munich, Germany

[21] Appl. No.: 734,187

[22] Filed: Oct. 21, 1996

[30] Foreign Application Priority Data

Nov. 7, 1995 [DE] Germany ............... 195 41 457.8

[51] Int. Cl.$^6$ ...................................... H04N 7/12
[52] U.S. Cl. ............................... 348/416; 348/413
[58] Field of Search ............................ 348/416, 402, 348/413, 699, 384, 405, 407, 409, 415, 417, 418, 420, 422; H04N 7/12, 11/02, 11/04

[56] References Cited

U.S. PATENT DOCUMENTS

| | | | |
|---|---|---|---|
| 5,126,841 | 6/1992 | Tanaka et al. | 348/415 |
| 5,235,419 | 8/1993 | Krause | 348/416 |
| 5,321,725 | 6/1994 | Paik et al. | 348/384 |
| 5,412,435 | 5/1995 | Nakajima | 348/699 |
| 5,440,344 | 8/1995 | Asamura et al. | 348/405 |
| 5,565,922 | 10/1996 | Krause | 348/413 |

OTHER PUBLICATIONS

"Overview of the px64kbit/s Coding Standard," Liou, Communications of the ACM, vol. 34, No. 4, Apr., 1991 pp. 60–63.

"The JPEG Still Picture Compression Standard,", Wallace, Communications of the ACM, vol. 34, No. 4, Apr., 1991 pp. 31–44.

"International Standardization of Picture Coding," Okubo et al., IEEE Transactions, vol. E74, No. 3, Mar., 1991 pp. 533–538.

"MPEG: A Video Compression Standard for Multimedia Applications," Le Gall, Communications of the ACM, vol. 34, No. 4, Apr., 1991, pp. 47–58.

"Ein Codec für die digitale Übertragung von HDTV–Signalen," Hoffmann et al., Rundfunktechnische Mitteilungen, vol. 5, 1992 pp. 196–205.

"New Trends in Very Low Bitrate Video Coding," Ebrahimi et al., Proc. of the IEEE, vol. 83, No. 6, Jun., 1995, pp. 877–891.

"Motion–Compensated Television Coding: Part I, " Netravali et al., Bell System Technical Journal, vol. 58 Mar., 1979, pp. 631–690.

*Primary Examiner*—Tommy P. Chin
*Assistant Examiner*—Y. Lee
*Attorney, Agent, or Firm*—Hill, Steadman & Simpson

[57] ABSTRACT

In a method for coding a video data stream of a video sequence consisting of image blocks, a motion estimate for each block by determining a motion vector for that individual image block. The motion vectors of adjacent blocks are checked for agreement with one another. The transformation coding of an image block to be coded is suppressed, if the motion vector for that image block best corresponds, as the result of the agreement check image vector of a preceding, already transformation-coded image block. In this way, a considerable savings of the required data rate for the transmission of the video data stream to the receiver is achieved, as is a considerable savings in computing expense for the execution of the transformation coding.

10 Claims, 2 Drawing Sheets

METHOD AND APPARATUS FOR CODING A VIDEO DATA STREAM OF A VIDEO SEQUENCE FORMED OF IMAGE BLOCKS

BACKGROUND OF THE INVENTION

1. Field of the Invention

The present invention is directed to a method and apparatus for coding a video data stream, and in particular to a method and apparatus for coding a video data stream of a video sequence formed of successive image blocks.

2. Description of the Prior Art

In the area of telecommunication technology, especially in the area of image processing, efficient coding of image data is continually increasing in importance. The coding of the data must be carried out so that the greatest possible compression of information is achieved with the loss of as little information as possible.

Various methods for coding a video data stream are known, e.g. MPEG, JPEG, H.261, H.263 (Ming Liou, Overview of the px64 kbit/s Video Coding Standard, Communications of the ACM, vol. 34, no. 4, pp. 60–63, April 1991, 1991; G. Wallace, The JPEG Still Picture Compression Standard, Communications of the ACM, vol. 34, no. 4, pp. 31–44, April 1991, 1991; S. Okubo et al., International Standardization on Picture Coding, IEEE Transactions, vol. E 74, no. 3, pp. 533–538, March 1991, 1991; D. Le Gall, The Video Compression Standard for Multimedia Applications, Communications of the ACM, vol. 34, no. 4, pp. 47–58, April 1991, 1991).

In addition, a block-based image coding method and an arrangement for carrying out the method for the digital transmission of HDTV signals is known (H. Hofmann and R. Schäfer, Ein Codec for die digitale Übertragung von HDTV Signalen, Rundfunktechnische Mitteilungen, Heft 5, pp. 196–205, 1992).

It is also known to skip over individual image blocks dependent on a motion estimate between an intra-image coding and an interimage coding (T. Ebrahimi et at., New Trends in Very Low Bitrate Video Coding, Proceedings of the IEEE, vol. 83, no. 6, pp. 877–891, June 1995).

These block-based image coding methods use principles of prediction coding and transformation coding.

In prediction, difference images are produced by subtraction of predicted image data from the original image data to be coded.

For the prediction, a motion-compensated prediction is used. The foundations of the motion estimate required for this, and its application to motion-compensated prediction, are known to those skilled in the art (A. N. Netravali and J. D. Robbins, Motion Compensated Television Coding: Part I, Bell System Technical Journal, vol. 58, pp. 631–690, March 1979).

In addition to motion-compensated prediction, motion-compensated interpolation is provided in the aforementioned standardized method for coding a video data stream. In connection with MPEG terminology, motion-compensated interpolation is also called bidirectional prediction. In the context of this application, however, the term motion-compensated interpolation is used.

The spatial correlations which are present in the difference images between adjacent image points are exploited using a suitable transformation, e.g. using discrete cosine transformation (DCT). The transformation coding used supplies transformation coding coefficients that are subjected to a quantizing and an entropy coding. The transformation coding coefficients are subsequently transmitted to a receiver, in which the entire coding process is carried out inversely. By this means, direct information concerning the image points is again available at the receiver after the decoding is carried out.

In the above-described known method for coding a video data stream, all difference images are always subjected to a transformation coding. If as a result of the motion estimate individual blocks are very similar, the difference, to be transformed, of the image block to be coded with the corresponding image block of the preceding image yields a very small value, which under some circumstances can be quantized to a discrete null value during the quantizing of the transformation coding coefficients.

Nonetheless, in the known block-based coding methods the individual blocks are subjected to a transformation coding, which means an unnecessary additional expense, since by means of the quantizing very similar blocks are quantized to a null value anyway as the result of a motion estimate.

SUMMARY OF THE INVENTION

An object of the invention is to provide a method for coding a video data stream of a video sequence formed by image blocks that reduces the expense for coding and decoding, and an arrangement for conducting the method.

The above object is achieved in accordance with the principles of the present invention in a method and apparatus for coding a video data stream of a video sequence formed of a plurality of successive image blocks, wherein the image blocks in the video sequence are a transformation-coded and the resulting transformation coefficients are quantized, with the quantized transformation coefficients being subjected to channel coding. Additionally, the quantized transformation coefficients are subjected to inverse quantization and inverse transformation coding in order to obtain a reconstructed video data stream. For each image block in the reconstructed video data stream, a motion estimate is conducted by forming a motion vector for each block. For a current image block in the incoming video sequence, yet to be transformation-coded, a motion estimate is conducted by forming a motion vector for that current image block. The motion vector for the current image block is compared to the respective motion vectors for selected image blocks in the reconstructed video data stream to obtain a comparison result which is indicative of a degree of agreement between the respective motion vectors for the current image block and at least one of the selected image blocks. The comparison result decreases with increasing disagreement, and if the comparison result is below a predetermined level, channel coding is undertaken only for the motion vector for the current image block, without transformation-coding the current image block itself. The reconstructed video data stream is subtracted from the incoming video data stream, so that only transformation-coding of the difference takes place.

The motion estimate carried out in the method for each image block respectively yields a motion vector for each image block in a reconstructed video data stream, this vector indicating the displacement of the image block of the reference image that best agrees with the image block to be coded of the original image.

If the motion vectors of adjacent image blocks in the reconstructed image, i.e. in the reconstructed video data stream, are the same or very similar, this indicates a motionless background or a rigid body, which were possibly moved translationally.

Thus, under the assumption that the respective image block was actually displaced only transnationally corresponding to the determined motion vector, the actual image information of the image block is already contained in the chronologically immediately preceding image, and was therefore also already coded and transmitted to the receiver.

A further transmission of this subsequent image block therefore is no longer necessary. Such further transmission means only additionally coded and transmitted redundancy, which leads to an increase in the data rate required for the transmission of the video data stream.

By means of the inventive method, these redundant image blocks are found, and only the actually required information for the restoration of the chronologically subsequent image, and the motion vector of the redundant image block, are coded and transmitted to the receiver.

Although in the known methods, given very low level transformation coding, coefficients that lie below a predeterminable quantization threshold, are not transmitted, by means of the inventive method transformation coding coefficients that lie above the quantization threshold are also set to the null value if the image blocks containing these transformation coding coefficients fulfill certain preconditions. In this way, transmission capacity and computing capacity are saved, since no transformation coding is carried out for the redundant image blocks, but rather the transformation coding coefficients are simply set to the null value.

In the receiver unit, the corresponding block of the chronologically preceding image is saved and is likewise used for the chronologically subsequent image, displaced of course by the value and the direction of the motion vector of the subsequent image block.

This method leads to a considerable reduction of the required data rate, or permits the available data rate to be better exploited, possibly leading to significant improvements in image quality. In addition, it is no longer required to carry out the transformation coding for these redundant image blocks, so that the method simultaneously produces a savings in the computing expense for the coding of the video data stream.

In an embodiment of the method, a quality criterion for the agreement of the image blocks of the preceding image and the video data stream that is currently to be coded, i.e. the image currently to be coded, is determined.

This ensues by a determination of the degree of agreement of the image information of the image block of the reconstructed video data stream with the image information of the data stream to be coded. If the agreement between the image blocks is too low, the entire block is coded in any case. This leads to an improvement in the achieved image quality.

DESCRIPTION OF THE PREFERRED EMBODIMENTS

An incoming video data stream VD is supplied to a transformation coding stage DCT and a quantization unit Q, which form a forward path VP.

The output of the forward path VP is supplied to a channel coding stage VLC for carrying out a channel coding of the quantized transformation coefficients, possibly with an additional unit for error recognition and/or error correction of bit errors.

The output of the forward path VP is also supplied to an inverse quantization unit IQ and an inverse transformation coding stage IDCT, which form a reverse path RP.

The output of a subtraction unit SE is supplied to the input of the transformation coding stage DCT. The output of the transformation coding stage DCT is connected to the input of the quantization unit Q. The output of the quantization unit Q is connected to the input of the inverse quantization unit IQ. The output of the quantization unit Q is connected to the input of the channel coding stage VLC. The output of the inverse quantization unit IQ is connected to the input of the transformation coding stage IDCT. The output of the transformation coding stage IDCT is connected to a first input of the addition unit AE. The output of the addition unit AE is connected to the input of the memory SP. The output of the memory SP is connected to a first input of the motion estimating unit BS.

A first output of the motion estimating unit BS is connected to a second input of the memory SP. By this connection, memory addresses ADR are transmitted to the memory SP by the motion estimating unit BS. The memory addresses ADR indicate the memory addresses required by the motion estimating unit BS.

A second output of the motion estimating unit BS is connected to a first input of the control unit ST. A first output of the memory SP is connected both to a second input of the subtraction unit SE and to a second input of the addition unit AE. A second output of the memory SP is connected to a second input of the control unit ST. A third input of the control unit ST is connected to a further terminal, to which the video data stream VD to be coded is likewise applied. The output of the control unit ST is connected to the transformation coding stage DCT.

The motion estimating unit BS is connected to a terminal to which the video data stream VD to be coded is applied.

A video data stream VD to be coded, consisting of individual image blocks BB, is applied to the first input of the subtraction unit SE.

In addition, the video data stream VD is applied to the motion estimating unit BS, wherein the video data stream is used to produce a motion estimate.

Figure 2:
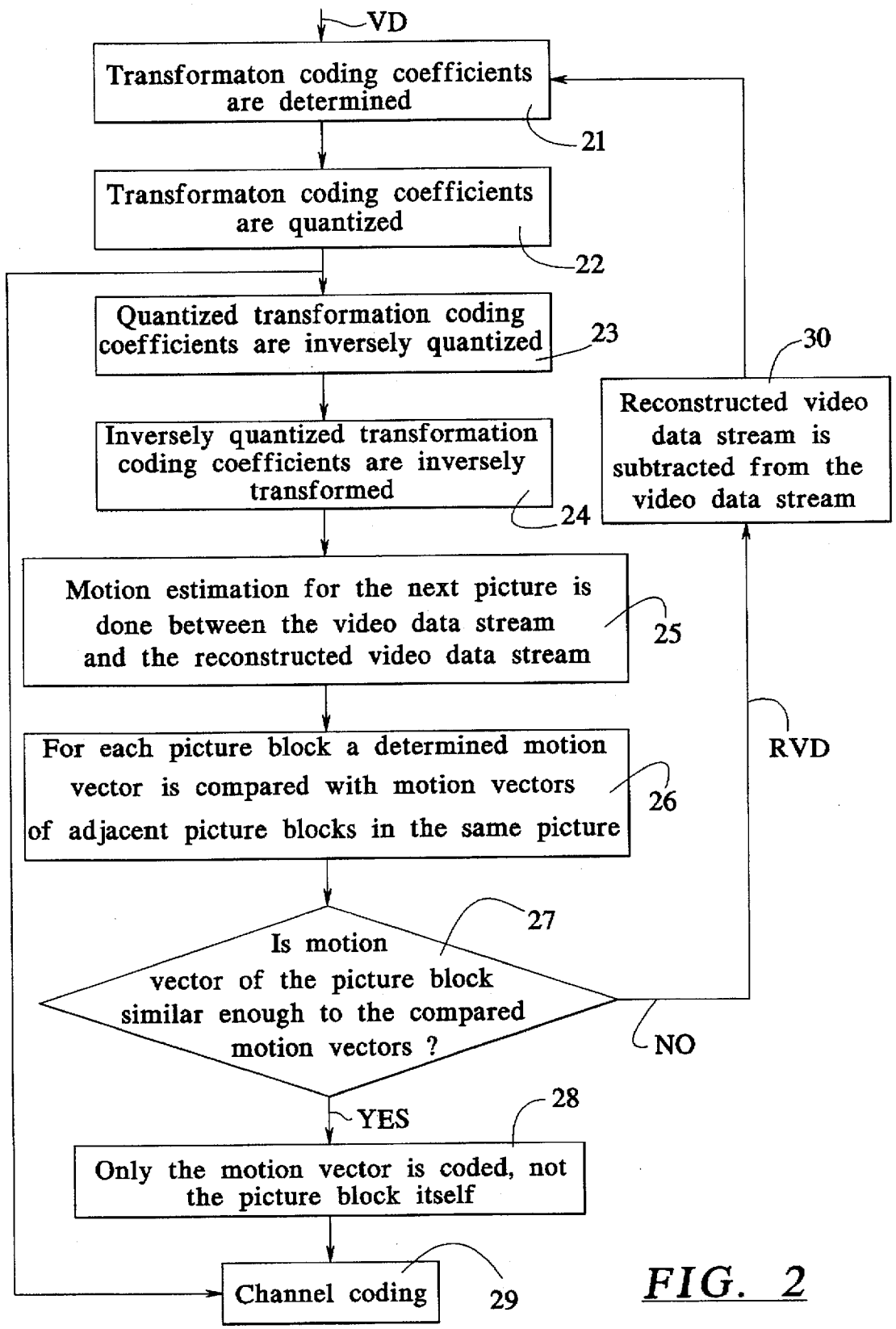
FIG. 2 is a flow chart in which the individual method steps of the inventive method are shown.

The image blocks BB of the video data stream VD to be coded are conducted via the subtraction unit SE into the transformation coding stage DCT, wherein a transformation coding is carried out on the individual image blocks BB of the video data stream VD (Step 21 in FIG. 2).

The transformation coding results in individual transformation coefficients, which are now quantized in the quantization unit Q in a further step 22.

These quantized transformation coefficients are supplied to the channel coding stages VLC, wherein a channel coding is applied to the quantized transformation coefficients, and the coded data are now transmitted to a receiver. The quantized transformation coefficients are also supplied to the inverse quantization unit IQ for carrying out an inverse quantization for the reconstruction of the transformation coefficients 23 in step.

In the channel coding stage VLC, in a further embodiment of the method and the arrangement, an error recognition and/or error correction can be provided.

The reconstructed transformation coefficients, i.e. the inversely quantized transformation coefficients, are subjected in the inverse transformation coding stage IDCT to an inverse transformation coding for reconstruction of the video data stream 24.

Since, as is further explained below, only difference images, i.e. only the difference between two chronologically successive images is coded, in this case of course only one reconstructed "difference video data stream" is obtained at the output of the inverse transformation coding stage IDCT. In order to obtain a reconstructed video data stream RVD, the missing "difference information" must be taken into account by means of a feedback of the output of the motion estimating stage BS, to the second input of the adder unit AE.

The reconstructed video data stream RVD is now stored in the memory SP. Normally, an entire image is stored in the memory SP.

The image information stored in the memory SP, i.e. the reconstructed video data stream RVD, is accessed during the motion estimate (step 25) subsequently carried out in the motion estimating unit BS.

The motion estimate can be conducted in various ways. One possibility is to compare the luminance values of the respective image block BB of the video data stream VD to be coded with the luminance values of areas (image blocks) located in the reconstructed images of the reconstructed video data stream RVD.

A possible criterion for determining the agreement of the image block to be coded with an area of the same shape and size in the reconstructed video data stream RVD is to form the absolute value of the difference of the luminance value of each image point of the image block BB and its corresponding image point in the examined area of the reconstructed video data stream RVD, i.e. of the reconstructed image, and then to sum these differences to obtain a total difference.

Further criteria, e.g. the difference of the squares of the luminance values of the individual image points of the image blocks, or higher powers of the luminance values of the individual image points of the image blocks, are likewise usable without limitation in the inventive method.

Further variants or alternatives of the motion estimation are likewise usable without limitation in the inventive method.

Dependent on the criterion used for the motion estimate described above, the image area of the reconstructed video data stream RVD is now selected that has the highest (best) agreement with the image block BB to be coded. Using the sum of the total values of the differences of the individual luminance values of the image points of the image blocks to be compared, the selected area is the minimum of the sum of the differences of the luminance values of the individual image points of the two compared image blocks.

In this case, the sum also can be used as an indication of the degree of agreement between the image block DB to be coded of the video data stream VD and the optimum area, enabled by the motion estimate conducted in BS, of the reconstructed video data stream RVD.

For determining of an indication of the quality of reconstruction, a comparison of the reconstructed image block of the reconstructed video data stream RVD with the corresponding image block BB to be coded of the video data stream VD ensues. This ensues, for example, by forming the sum of the absolute values of the differences of the individual luminance values of the image points of the image blocks to be compared.

Additional procedures for determining the quality of reconstruction, e.g. the difference of the squares of the luminance values of the individual image points of the image blocks, or higher powers of the luminance values of the individual image points of the image blocks, are likewise usable in the inventive method without limitation.

In an advantageous further embodiment of the method, the transformation coding for the respective image block BB is suppressed only if the reconstruction quality exceeds a value that lies above a freely selectable reconstruction quality threshold.

The type of motion estimation is not important in the inventive method. It is important only that as a result of the motion estimate a motion vector BV is allocated to each image block of the video data stream VD to be coded.

The motion vector BV specifies the spatial displacement, within the image, of the chronologically preceding image to the image currently to be processed, for the image blocks for which the best agreement was determined during the motion estimation.

After at least two motion vectors of two adjacent image blocks have been determined by means of the motion estimation in BS, the motion vector BV for a given block is compared in step 26 to the motion vectors allocated to image blocks that are adjacent to the given image block to which the motion vector BV to be examined is allocated. A determination is made in step 27 as to whether, for each comparison the compared vectors are the same or very similar.

This comparison can, for example, be conducted by forming the absolute values respective differences of the components of each adjacent motion vectors and the components of the vector BV for the given block.

In the following, the adjacent motion vectors are called additional motion vectors UBV, and the adjacent image blocks, to which the additional motion vectors UBV are respectfully allocated, are called additional image blocks UBB.

In a further embodiment of the method it is advantageous, even for the case in which the adjacent additional motion victors UBV differ clearly from one another, to carry out a further check, consisting of storing the additional motion vectors UBV of the eight adjacent blocks of the image block BB as relevant motion vectors. For each of the eight displacements by the stored motion vectors, the sum of the absolute values of the differences of the individual luminance values of the image points of the image blocks to be compared is formed.

If the minimum of these eight sums lies below a freely selectable adjacency threshold, the motion vector corresponding to the minimum is used as a new motion vector BV, allocated to the image block BB.

Since the degree of agreement depends on difference values, which become smaller as agreement increases, a lower comparison result indicates a higher degree of agreement.

In this connection, for example, the following three variants are possible, in which additional image blocks UBB are used:

1. The comparison of the motion vectors ensues only with spatially (in relation to a scan method used) preceding image blocks. In this case, the comparison can ensue for each motion vector BV directly after the determination of the motion vector by means of the motion estimate. By this means, a time delay in the coding of the video data stream VD, which is unavoidable in the two other variants, is avoided.

2. For the case in which the scan method used processes the individual image blocks line by line, and also wherein the motion estimating unit BS determines the motion vectors line by line, the motion estimate is always conducted for the image blocks of an entire line, and only when motion vectors BV of another line with the further motion vectors UBV of the further image blocks UBB are formed is a comparison made. It is true that this procedure leads to a slight delay in the coding of the video data stream VD, but it offers the advantage that a larger number of motion vectors can be compared with one another, leading to an improvement in the reliability of the comparison of the motion vectors.

3. In a third variant, first the motion vectors are determined for all image blocks of an image by the motion estimate. Only then are the motion vectors compared with one another. The advantages and disadvantages indicated with regard to the above second variant remain in this procedure, to an amplified degree.

Thus, a value is calculated that describes the similarity of the motion vector to be examined to the motion vectors of its surroundings.

If this value is lower than the value of a freely selectable first lower limit used in step 27, the transformation coding of the image block BB currently to be coded is suppressed (step 28) by means of a signal BSDCT supplied from the control unit ST to the transformation coding state DCT. Only the motion vector BV itself is then channel-coded in the channel coding stage VLC (step 29), by direct supply to the channel coding stage VLC.

The reconstructed video data stream RVD is fed to the subtraction unit SE via the second input of the subtraction unit SE. There the difference between the video data stream VD to be coded and the reconstructed video data stream RVD is formed (step 30).

The transformation coding in the transformation coding stage DCT is thus applied only to the difference of two chronologically successive images.

The agreement of the motion vectors in a contiguous area means, for example, that this part of the image corresponds to a moved background or also to only one rigid body. This clearly shows the savings achieved through the inventive method. This is because the coding and transmission to the receiver of the redundancy of, e.g., an unchanging background, displaced only transnationally from one image to the other, is avoided.

The method can likewise be used in image areas that contain non-rigid bodies, with all other types of motion, i.e. not only for translational displacement, if these other motions take place relatively slowly, and with slow zoom effects.

It is provided in a further embodiment of the invention the agreement quality for each new coded image block is determined by comparison with the original image block. This can ensue, for example, by forming an average of the absolute values of the difference, or by forming a squared difference, of the individual luminance values of the image points of the image blocks. Alternatively, the maximum absolute difference can be formed, or also linear combinations of these different formations.

If the agreement quality undershoots a selectable second lower limit, which would mean a loss of quality of the reconstructed video data stream that is no longer acceptable in some circumstances at the receiver, in this further embodiment the suppression of the transformation coding of that block is over-ridden, and respective image block of the video data stream VD is still supplied to the transformation coding stage DCT and is transformation-coded.

Figure 1:
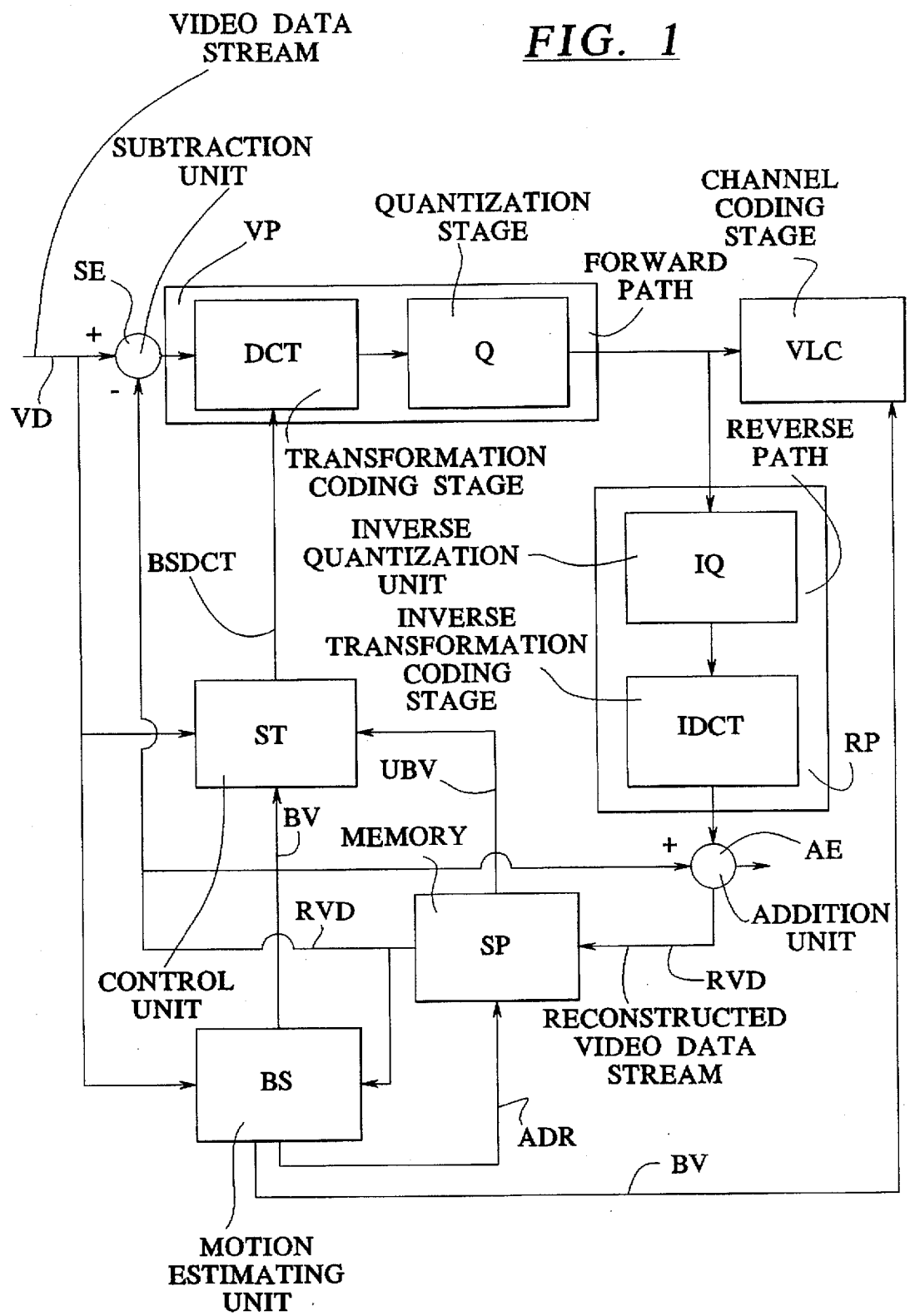
FIG. 1 is a block diagram arrangement of a coder with a control unit, with which the determined motion vectors of each image block are compared with the adjacent motion vectors of the image block, and, given sufficient agreement, the coding of the corresponding image block is suppressed in the subsequent difference image, in accordance with the inventive method.

The forward path VP and the reverse path RP can include further components not shown in FIG. 1. These components can be provided for conducting (according to standards), e.g., scan methods, inverse scan methods, a vector quantization, a run-length coding or also a run-length decoding.

These additional components, and the procedural steps that thereby additionally arise, which steps are conventionally used in the currently standardized block-based coding method, can of course be used without limitations in the inventive method and in the inventive arrangement.

Since these procedural steps are carried out in a standardized manner and are not essential for the actual invention, they need not be further specified.

Although modifications and changes may be suggested by those skilled in the art, it is the intention of the inventors to embody within the patent warranted hereon all changes and modifications as reasonably and properly come within the scope of their contribution to the art.

I claim as my invention:

1. A method for coding a video data stream of a video sequence formed of a plurality of successive image blocks, said method comprising the steps of:

transformation-coding a plurality of image blocks in a video data stream to obtain transformation coefficients for each image block;

quantizing said transformation coefficients to obtain quantized transformation coefficients;

channel coding said quantized transformation coefficients;

inverse quantizing said quantized transformation coefficients to obtain inversely quantized transformation coefficients and inverse transformation-coding said inversely quantized transformation coefficients to obtain a plurality of image blocks in a reconstructed video data stream;

conducting a motion estimate for each image block in said reconstructed video data stream by forming a motion vector for each image block in said reconstructed video data stream;

for a current image block in said video data stream, yet to be transformation-coded, conducting a motion estimate by forming a motion vector for said current image block;

determining a degree of agreement of the motion vector for said current image block to the respective motion vectors for selected image blocks in said reconstructed video data stream;

if said degree of agreement satisfies a predetermined criterion, channel coding only the motion vector for said current image block without transformation-coding said current image block; and subtracting said reconstructed video data stream from said video data stream to obtain a difference and transformation-coding only said difference.

2. A method as claimed in claim 1 wherein the step of determining said degree of agreement comprises comparing the motion vector for said current image block to the respective motion vectors for selected image blocks in said reconstructed video data stream to obtain a comparison result indicative of said degree of agreement between said motion vector for said current image block and the motion vectors for at least one of said selected image blocks, with said comparison result decreasing with increasing agreement, and comprising the additional step of determining whether said predetermined criterion is met by determining if said comparison result is below a predetermined level and channel coding only the motion vector for the current image block without transformation-coding said current image block if said comparison result is below said predetermined level.

3. A method as claimed in claim 2 comprising the additional steps of:

determining if said comparison result is below a further predetermined level, said further predetermined level being lower than said predetermined level, and if said comparison result is below said further predetermined level, overriding the step of channel coding only the motion vector for said current image block, and transformation-coding said current image block.

4. A method as claimed in claim 1 comprising the additional step of:

if said degree of agreement satisfies a further predetermined criterion, overriding the step of channel coding only the motion vector for said current image block, and transformation-coding said current image block.

5. A method as claimed in claim 1 comprising the additional step of:

selecting, as said selected image blocks, image blocks in said reconstructed video data stream preceding said current image block.

6. A method as claimed in claim 1 wherein said image blocks in each of said video stream and said reconstructed video data sequence represent respective lines of an image, and comprising the additional step of selecting, as said selected image blocks, image blocks in a line preceding a line containing said current image blocks, other image blocks in said line containing said current image block, and image blocks in a line immediately following said line containing said current image block.

7. A method as claimed in claim 1 wherein said video sequence includes a plurality of image blocks comprising an image, and wherein said method comprises the additional steps of:

conducting said motion estimate for all image blocks in said image before determining said degree of agreement;

selecting, as said selected image blocks, all image blocks in said image bordering directly on said current image block.

8. A method as claimed in claim 1 wherein each image block in said reconstructed video data stream corresponds to a respective image block in said video data stream, and comprising the additional steps of:

for each image block of the reconstructed video data stream, identifying a reconstruction quality compared to the corresponding image block of the video data stream; and for any reconstructed image block for which said reconstruction quality fails to satisfies a predetermined reconstruction quality criterion, overriding the step of channel coding only the motion vector for said current image block, and transformation-coding any image block which fails to satisfy said predetermined reconstruction quality criterion.

9. A method as claimed in claim 1 wherein each image block has a plurality of luminance values associated therewith, and comprising the additional steps of:

identifying a total absolute value of differences between the luminance values of said current image block and each of said selected image blocks;

identifying one of said selected image blocks for which said total is smallest; and replacing the motion vector of said current image block with the motion vector of said one of said selected image blocks for which said total is smallest.

10. An apparatus for coding a video data stream of a video sequence formed of a plurality of successive image blocks, said apparatus comprising:

means for transformation-coding a plurality of image blocks in a video data stream to obtain transformation coefficients for each image block;

means for quantizing said transformation coefficients to obtain quantized transformation coefficients;

means for channel coding said quantized transformation coefficient;

means for inverse quantizing said quantized transformation coefficients to obtain inversely quantized transformation coefficients and inverse transformation-coding said inversely quantized transformation coefficients to obtain a plurality of image blocks in a reconstructed data stream;

means for conducting a motion estimate for each image block in said reconstructed video data stream by forming a motion vector for each image block in said reconstructed video data stream;

means for, for a current image block in said video data stream, yet to be transformation-coded, conducting a motion estimate by forming a motion vector for said current image block;

means for determining a degree of agreement of the motion vector for said current image block to the respective motion vectors for selected image blocks in said reconstructed video data stream;

means for, if said degree of agreement satisfies a predetermined criterion, channel coding only the motion vector for said current image block without transformation-coding said current image block; and means for subtracting said reconstructed video data stream from said video data stream to obtain a difference and transformation-coding only said difference.

* * * * *